Jan. 7, 1947.  C. H. JOLLY  2,413,713
RELEASE MECHANISM
Filed June 20, 1932

CARL H. JOLLY
INVENTOR

BY
ATTORNEY

Patented Jan. 7, 1947

2,413,713

UNITED STATES PATENT OFFICE 2,413,713

RELEASE MECHANISM

Carl H. Jolly, United States Navy

Application June 20, 1932, Serial No. 618,257

12 Claims. (Cl. 244—110)

(Granted under the act of March 3, 1883, as amended April 30, 1928; 370 O. G. 757)

My invention relates broadly to improvements in arresting hook release mechanism and more particularly to a means for accomplishing the quick release of the arresting hook of an airplane after the same has landed and engaged the transverse retarding cables upon a restricted landing area so equipped.

The primary object of my invention being to provide an aircraft landing equipment with a quick and efficient mechanism for release of the arresting hook from engagement with the transverse retarding cable or cables of restricted landing area.

A further object of my invention is to provide a release device that will accomplish the quick and efficient separation of an arresting hook carried by an airplane from a transverse retarding cable of an arresting mechanism mounted upon a landing area by means of a manually operated release device slidably mounted upon the transverse retarding cable.

Another object of my invention is to provide a device that is rugged, of light weight, and one that can be easily installed.

With the above and other objects in view the invention consists in the construction, combination and arrangement of parts as will be described more fully hereinafter.

Reference is to be had to the accompanying drawing forming a part of the specification, in which like reference characters indicate corresponding parts throughout the several views and in which.

Figure 1:
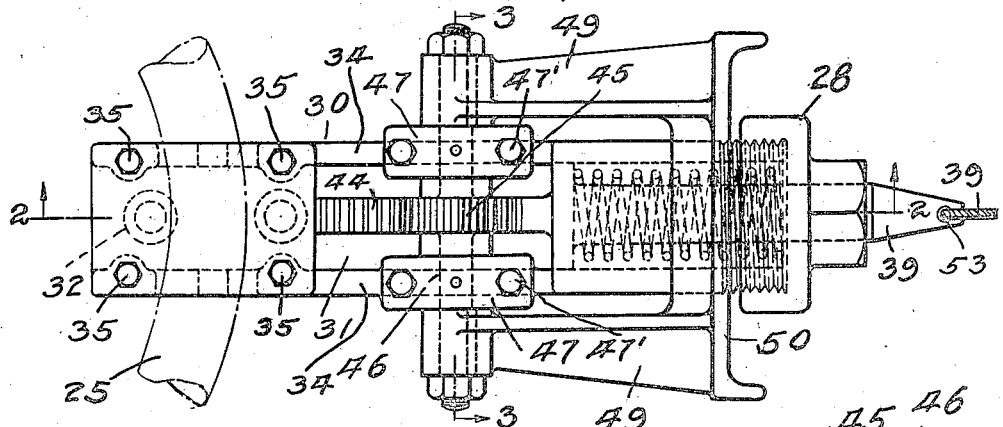
Figure 1 is a plan view of my device for the release of an arresting hook suspended from an airplane from engagement with a transverse retarding cable by means of a traveler located upon the retarding cable.
Figure 3:
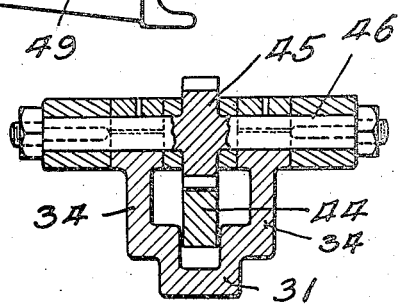
Figure 3 is a detail transverse section on the line 3—3 of Figure 2.

Referring more particularly to the drawing, 20 indicates the lower portion of an arresting gear hook 21 suspended below the land-chassis of a conventional airplane 23, after being brought to rest upon a landing area 24 by engagement of the hook 21 with one of a series of transverse retarding cables 25 of an arresting equipment of a statutory retarding mechanism.

After an airplane has made a landing and the hook by engagement with a transverse landing cable has brought the airplane to rest it is very desirable at times to quickly disconnect the hook 21 from the cable 25 so that the airplane may immediately take off or taxi out of the way to clear the landing area for other airplanes approaching for landings. It is desirable to provide a device that may be operated from some remote location to disconnect or free the airplane without endangering the lives of the attendant who would necessarily be compelled to rush out to the airplane.

To accomplish the release of the hook 21 suspended from the airplane from the transverse cable 25 of the arresting mechanism of a landing area I provide one or more release devices 30 which are mounted so as to be freely slidable along the transverse cable or cables 25.

The release device 30 consists of a base casting 31 provided with a series of guide rollers 32 which engage the cable 25. A cap 33 is attached to the side frames 34 of the base casting 31 and is secured by bolts 35. The rollers 32 have their trunnions located in bearings in the cap 33 and the base casting 31. The forward end of the member 31 terminates in a threaded cap 28 which acts as a guide for a sliding member 41 and also as a stop to prevent the same from being drawn out beyond the desired limits.

A spring 40 surrounds the forward portion of the member 41 and a flange 42 provides a guide bearing within the bore 43 and also provides a shoulder for the spring 40. The member 41 terminates in a rack 44 at the rear end which is engaged by a pinion 45 having a shaft 46 supported in bearings covered by the caps 47 secured by bolts 47' in the side walls of the member 31.

The pinion 45 is made integral with the shaft 46 as shown or may be keyed if preferred, and the outer ends of the shaft 46 have keyed to them the legs 49 of a yoke 50.

Figure 2:
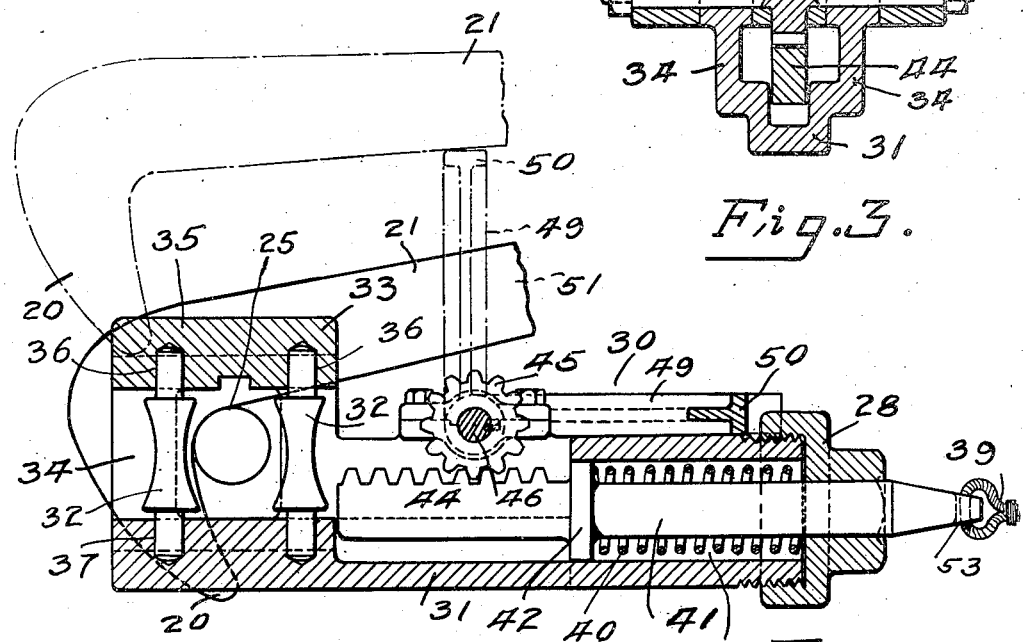
Figure 2 is a central longitudinal section on the line 2—2 of Figure 1.
Figure 4:
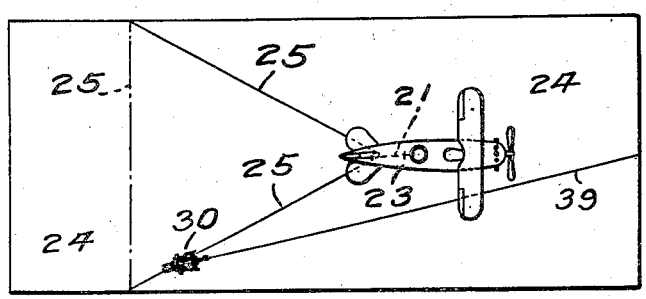
Figure 4 is a diagrammatic view of a restricted landing area showing the position of one of the transverse retarding cables after an airplane has landed thereon, and the relative location of my release device prior to release of the hook carried by the airplane from the retarding cable.

The yoke 50 is raised under the pressure of the spring 40, and is operated by an attendant located forward of the landing area who pulls upon a cable 39 attached to the eye 53 located at the forward end of the member 41, which causes the member 30 to slide along the slope of the retarding cable while in the paid out position until the member 30 reaches the side of the arresting hook 21 at which time the attendant by continuing to pull in one the cable 39 will overcome the tension of the sprig 40 will cause the rack to rotate the pinion to swing the yoke 50 from the horizontal position shown in full lines in Figure 2 to the broken lines shown in vertical position thus causing the cross member of the yoke 50 to raise the hook 21 to permit the nose of the hook 21 to be freed from the transverse cable 25 to which it had made contact and thus free the airplane 23.

It will be understood that the above description and accompanying drawings comprehend only the general and preferred embodiment of my invention, and that various changes in construction, proportion and arrangement of parts may be within the scope of the appended claims, and without sacrificing any of the advantages of my invention.

The herein described invention may be manufactured and used by or for the Government of the United States for governmental purposes without the payment to me of any royalties thereon.

What I claim is:

1. In an airplane arresting mechanism for arresting an airplane having a hook, in combination, a transverse cable for engagement with the hook, and means carried by the transverse cable for releasing said hook from said cable.

2. In an airplane arresting mechanism for arresting an airplane having a hook, in combination, a transversely located retarding cable for engagement with said hook, a hook release follower free to slide on said cable for releasing said hook from said cable, and a manually operated fairlead connected to said hook release follower for drawing the same into contact with said hook and raising the same clear of said retarding cable.

3. In an airplane arresting mechanism for arresting an airplane having a hook, in combination, a transversely located retarding cable upon a landing area for engagement with the hook, a follower slidably attached to said cable for releasing the hook from said cable, and a fairlead actuated from the landing area connected to said follower for drawing said follower into position beneath the hook and for causing the hook to be freed from the cable.

4. In a release mechanism for disengaging an arresting hook suspended from an airplane from a transverse cable of a retarding mechanism of a landing area, in combination, a transverse cable, a release device mounted to freely slide along the transverse cable, said release device comprising a base member, a yoke for contact with the shank of the arresting hook, said yoke having bearing surfaces in said base member, a plunger slidably mounted in a bore in said base member, a spring surrounding said plunger for retaining said plunger and said yoke in inactive position, a rack and pinion connection between said plunger and said yoke, and a fairlead connected to said plunger for operating the release device.

5. In a device for release of the arresting hook of an aircraft from a transverse retarding cable of a landing area, in combination, a base member, a series of guide rollers for contact with said retarding cable, bearing blocks for said rollers supported on said base member, a plunger, a toothed rack on said plunger, a spring on said plunger for normally retracting said plunger, a fairlead cable connected to said plunger, a threaded cap on said base member acting as a guide for said plunger, a pinion in mesh with said toothed rack, bearings in said base member for said pinion, a yoke actuated by said pinion to release the hook when said fairlead is manually pulled.

6. In a device for releasing the arresting gear hook attached to an aircraft from engagement with a retarding cable of a landing area, in combination, a release member slidably attached to the retarding cable, a tripping mechanism attached to said release member, an actuating cable attached to said tripping mechanism, means associated with said release member for freeing the hook from the cable by exerting tension upon said actuating cable.

7. In a device for freeing the suspended arresting hook of an airplane from an arresting gear, in combination, a transverse retarding cable of an arresting gear, a block slidably mounted on said cable, means carried by said block for tripping the arresting hook, and means associated with said block for bringing said tripping means into tripping position for the release of the arresting hook.

8. In a device for freeing the arresting hook of an aircraft from a stationary retarding gear, in combination, a transverse retarding cable, a block slidably mounted on said cable, said block having tripping means associated therewith for contacting the arresting hook, and manually operated means for sliding said block into operative position along said cable.

9. In a device for freeing the suspended arresting hook of an aircraft from landing stage, in combination, a transverse retrieving cable, a block slidably mounted on said cable, said block adapted to stow at either end of said cable out of the line of flight of the aircraft when landing, means carried by said block for release of the arresting hook from said cable, and means for bringing said block into releasing position beneath the arresting hook, said last means adapted to bring said block and release to stowage position toward either end of said cable.

10. In a release mechanism for freeing an arresting member carried by an airplane from a retarding cable on a landing area in combination, a cable, a release mechanism free to slide along the cable, a spring tensioned trigger for tripping the cable from the arresting hook, a manually operated fairlead connected to release mechanism and extending to a location remote from the aircraft for actuating said arresting member.

11. In a release mechanism for freeing an arresting member carried by an airplane from a retarding cable on a landing area in combination, a cable, a release mechanism free to slide along the cable, a plunger within said mechanism having a rack and pinion and a spring for normally rendering said rack and pinion inactive, a yoke carried by said mechanism adapted to be actuated by said pinion to release the hook from the cable, a manually operated fairlead for actuating said plunger from the landing area connected to the plunger for raising said yoke to trip said cable from the hook.

12. In a device for releasing an arresting member carried by an aircraft, comprising a hook release follower, a plunger within said follower, having a rack portion, a pinion in said follower in engagement with said rack, a spring in said follower for normally holding said plunger inactive, a yoke carried by said follower adapted to engage said arresting member when said spring is contracted.

CARL H. JOLLY.